United States Patent
Rahier

(10) Patent No.: US 6,461,106 B1
(45) Date of Patent: Oct. 8, 2002

(54) METHOD FOR REDUCING BLADE-VORTEX INTERACTION NOISE GENERATED BY A ROTARY WING

(75) Inventor: Gilles Rahier, Le Plessis Robinson (FR)

(73) Assignee: ONERA (Office National d'Etudes et de Recherches Aerospatiales), Chatillon (FR)

( * ) Notice: Subject to any disclaimer, the term of this patent is extended or adjusted under 35 U.S.C. 154(b) by 0 days.

(21) Appl. No.: 09/743,469

(22) PCT Filed: Aug. 5, 1999

(86) PCT No.: PCT/FR99/01940

§ 371 (c)(1),
(2), (4) Date: Jan. 10, 2001

(87) PCT Pub. No.: WO00/09393

PCT Pub. Date: Feb. 4, 2000

(30) Foreign Application Priority Data

Aug. 17, 1998 (FR) ............................................. 98 10467

(51) Int. Cl.[7] .............................................. B64C 11/00
(52) U.S. Cl. .............................. 416/1; 416/23; 416/42; 416/500
(58) Field of Search ........................... 415/119; 416/23, 416/24, 42, 158, 228, 1, 500; 244/212, 17.11, 17.13, 17.25, 199, 203

(56) References Cited

U.S. PATENT DOCUMENTS

| | | | | |
|---|---|---|---|---|
| 3,822,105 | * | 7/1974 | Jepson | 416/223 R |
| 4,046,336 | * | 9/1977 | Tangler | 244/130 |
| 4,519,743 | * | 5/1985 | Ham | 244/17.13 |
| 5,588,800 | | 12/1996 | Charles et al. | 416/24 |
| 5,750,891 | * | 5/1998 | Brocklehurst | 73/178 H |
| 5,938,404 | * | 8/1999 | Domzalski et al. | 416/42 |

FOREIGN PATENT DOCUMENTS

| | | |
|---|---|---|
| EP | 482932 | 5/1995 |
| EP | 689990 | 1/1996 |
| FR | 2636593 | 3/1990 |
| WO | 9707019 | 2/1997 |

OTHER PUBLICATIONS

Ariyur, K. B. et al.: "Feedback Attenuation and Adaptive Cancellation of Blade Vortex Interaction Noise on a Helicopter Blade Element" Proceedings of the 1998 American Control Conference, vol. 2, pp. 1053–1057, Jun. 1998.

Yu, Y. H. et al.: "Reduction of Helicopter Blade–Vortex Interaction Noise by Active Rotor Control Technology" Progress in Aerospace Sciences, vol. 33, No. 9–10, pp. 647–687, 1997.

"Smart Hush Helicopters" Machine Design, vol. 66, No. 15, pp. 36–38, Aug. 8, 1994.

Translation PCT International Preliminary Examination Report dated May 15, 2000.

* cited by examiner

Primary Examiner—Edward K. Look
Assistant Examiner—Igor Kershteyn
(74) Attorney, Agent, or Firm—Stevens, Davis, Miller & Mosher, LLP

(57) ABSTRACT

The present invention relates to a method for reducing the blade-vortex interaction noise of rotary wings. According to the invention: at least one value $\Psi_o$ of the azimuth of the blades (1) is determined, for which value said blades shed tip vortices giving rise to a peak intensity of noise; a trailing edge flap (2) is disposed on each blade (1), the former generating an auxiliary vortex (11), parallel to the tip vortex (10) and attached to a blade section (8) lying between the blade section (7) around which the speed circulation is a maximum and the tip section (3) of said blade; and a deflection is applied to each of said flaps (2) such that, for said value $\Psi_o$, the speed circulation around said blade section (8) is a specified fraction of the maximum speed circulation.

17 Claims, 2 Drawing Sheets

METHOD FOR REDUCING BLADE-VORTEX INTERACTION NOISE GENERATED BY A ROTARY WING

BACKGROUND OF THE INVENTION

A. Field of the Invention

The present invention relates to a method for reducing the blade-vortex interaction noise—generally referred to as BVI noise in the art—generated by a rotary wing. It also concerns a rotary wing implementing such a method.

B. Description of Related Art

It is known that, during low-speed flights, in particular when descending before landing, the blades of a rotor of a helicopter or of a similar aircraft move in proximity to their own wake and interact with the vortices which they have shed in the vicinity of their tip and which are generally referred to as "tip vortices". These interactions create abrupt variations in pressure on the blades; the more intense the vortex and the closer it passes to the blade, the greater the amplitude of these pressure variations. The latter are sources of loud noise in a particularly audible frequency band. Since the blade-vortex interaction noise radiates downward and forward, that is to say toward the environs of heliports, it constitutes one of the most penalizing acoustic nuisances in the development of helicopters. Its reduction is today a major industrial issue, especially on account of the strengthening of international standards relating to acoustic nuisances.

In order to reduce the intensity of BVI noise, essentially two actions are known, consisting respectively in decreasing the intensity of the blade tip vortices and in distancing said vortices from said blades. These actions may be amalgamated and implemented by passive or active means.

For example, the documents FR-A-2 636 593, EP-A-0 482 932 and WO 97/07019 describe passive means of this type, formed by geometries of blades, especially of tips of blades, intended to reduce the intensity of said vortices.

Passive means of this type are optimized for a given flight configuration. They have the advantage of a certain technological simplicity. On the other hand, their effectiveness may depend greatly on the flight configuration. Specifically, the conditions of the BVI noise change as a function of the flight speed and of the angle of descent of the helicopter. Moreover, the techniques proposed are unnecessary in flight configurations which do not generate BVI noise and then generally prove to be penalizing in respect of the aerodynamic performance of the rotor.

Active means of reducing BVI noise are for example described by the documents EP-A-0 689 990 and U.S. Pat. No. 5,588,800. The first of these documents employs air jets at the trailing edge and at the tip of the blades in order to reduce the intensity of the tip vortices and distance them from said blades. The second uses a trailing edge flap toward the tip of the blades, the deflection of said flap being periodic and defined so as to accelerate the vertical convection of the tip vortices and thus distance them from said blades.

Active means of this type are technically more complex than said passive means, but they can be adjusted as a function of the flight configuration of the aircraft. They may therefore be activated only when they are necessary and be optimized within a more extensive flight domain. On the other hand, in their manner of operation they do not comprise any continuous reactive relation between the flight configuration under actual flight conditions—and their control. Furthermore, their manner of operation requires significant power. In particular, in the case of the device of document U.S. Pat. No. 5,588,800, the rotary wing has to be provided with high power, able to make the aerodynamic flaps oscillate at frequencies of the order of 20 Hz with amplitudes of several degrees.

The object of the present invention is to remedy these drawbacks. It relates to an active means of reducing BVI noise of the type with trailing edge flaps, the deflection of which can be feedback-controlled in relation to the actual flight conditions and which requires only relatively low power for its operation.

To this end, according to the invention, the method for reducing the noise generated by the rotary wing of an aircraft, such as a helicopter, due to the fact that, in the course of the rotation of said rotary wing and of the advancing of said aircraft, each component blade of said rotary wing encounters the tip vortex generated by a previous blade, said method implementing at least one trailing edge flap disposed toward the outboard tip of each of said blades, is noteworthy in that:

at least one value $\Psi_o$ of the azimuth of the blades is determined, for which value said blades shed tip vortices responsible for a peak intensity of said noise;

the section of each blade around which the speed circulation is a maximum is determined;

said trailing edge flap is disposed on each blade in such a way that the former generates at least one auxiliary vortex, parallel to said tip vortex and attached to a section of said blade lying between said section around which the speed circulation is a maximum and the tip section of said blade; and a deflection is applied to each of said flaps, its value being constant in azimuth, but such that, for said value $\Psi_o$ of the azimuth, the speed circulation around said blade section to which said auxiliary vortex is attached is a specified fraction of said maximum speed circulation.

The present invention is based on the fact that BVI noise is not generated uniformly around the axis of rotation of the rotary wing, and that, during each cycle of rotation, each blade of the rotary wing sheds vortices whose characteristics, such as location of shedding, dimension, intensity, etc. are related to the load and to the geometry of the blades. The applicant has in particular found that the tip vortices of blades responsible for dominant BVI noise are shed by the blades—regardless of how many blades go to make up the rotary wing—at a specified azimuth, generally lying between 120° and 150° and often roughly 130°, reckoned in the direction of rotation of the blades starting from the 0° azimuth, which corresponds to the rear part of the longitudinal axis of the aircraft. BVI noise therefore includes, during each cycle of rotation, at least one peak intensity corresponding to the interaction with the tip vortices shed at this specified azimuth.

The value $\Psi_o$ of the azimuth, as well as the section of each blade around which the speed circulation is a maximum can be determined by calculation or by trials.

Thus, by virtue of the present invention, at the azimuth $\Psi_o$ and at azimuths neighboring $\Psi_o$, the blades of the rotary wing shed several weaker vortices than the single vortex which would be shed at blade tips in the absence of implementation of the invention. The latter therefore makes it possible to divide each of these single vortices into several vortices of lower speed circulation rather than to distance them from the following blades. This results in a reduction in a dominant part of the BVI noise.

Of course, in the case where it is necessary, it is possible to apply the method in accordance with the present invention to several values $\Psi o1, \Psi o2, \ldots \Psi on$ of the azimuth at which the tip vortices shed would be the cause of BVI noise rather than to a single privileged value $\Psi o$ of the azimuth of the blades.

Likewise, in accordance with the present invention, it is possible to employ more than one trailing edge flap per blade, so as to divide the vortical shedding into a plurality of auxiliary vortices. However, in this case there is a risk that auxiliary vortices which are too close to one another may combine into a single vortex.

Also, in a preferred mode of implementation of the present invention:

- a single trailing edge flap is employed per blade;
- said section to which said auxiliary vortex is attached is located at least approximately midway between said section around which the speed circulation is a maximum and said tip section of said blade; and
- the speed circulation around the blade section to which said auxiliary vortex is attached is at least approximately equal to half said maximum speed circulation.

Thus, each blade sheds, at the value $\Psi o$ of the azimuth and in the vicinity of this value, two vortices whose circulation is roughly half that of a single vortex at the blade tip. It has been found that this splitting of the vortical shedding into two similar vortices, in the vicinity of a single blade azimuth value $\Psi o$ at which the tip vortices responsible for the dominant BVI noise are shed, brings about a reduction in said BVI noise of the order of 7 dB.

Of course, said flaps may be actuated by any known mechanical, electrical, pneumatic or hydraulic means.

It will be observed that, in the method in accordance with the present invention, the deflection of the flap or flaps at the value or values $\Psi o$ of the azimuth of the blades depends on the load of the blades at the same azimuth values, implementing as it does the speed circulation around the sections of said blades.

Each blade of the rotary wing can comprise a trailing edge flap which extends as far as the blade tip section. If said blade includes only this one flap, the latter therefore extends between said blade tip section and the blade section located approximately midway between said section around which the speed circulation is a maximum and said blade tip section. In this case, the single trailing edge flap generates two similar vortices attached to its tips.

As a variant, each blade of the rotary wing can comprise a trailing edge flap which is separated from said blade tip section by a tip portion of said blade. If said blade includes only this one flap, said blade tip portion extends between said blade tip section and the blade section located approximately midway between said section around which the speed circulation is a maximum and said blade tip section. In this case, three vortices occur, one attached to said tip section and the other two attached to the tips of said trailing edge flap. To prevent the vortex attached to the inboard tip of the flap from interfering with the other two and/or from being the cause of noise, it is then advantageous for the span of said flap to be relatively large for example at least equal to 3 C (C being the chord of the blade airfoil), so that said inboard tip of the flap, and hence the vortex attached thereto, is spaced apart from the other two vortices, in the direction of the axis of said rotary wing.

It is however advantageous for each blade to be equipped with just one flap placed at the tip of said blade, of span lying between 0.4 C and 3 C, preferably equal to 1.2 C.

Regardless of the disposition of said flaps on the blades, it is advantageous for the depth of said flaps to be chosen between 0.1 C and 0.4 C, preferably equal to 0.25 C.

To implement the method in accordance with the present invention, it is possible to use lift information, pressure information or strain information to glean the speed circulations around the blade section at maximum circulation and around the section midway between the latter and the tip section. This information can be delivered by sensors and/or calculated by an on-board computer.

Thus, by virtue of the present invention, said flaps can easily be controlled so as to obtain a reduction in the BVI noise, at least that due to the tip vortices shed at the specified values $\Psi o$. For this purpose, the angle of deflection a of said flaps can be feedback controlled.

For reasons of power, it is preferable for the feedback control to relate to the deflection a of said flaps only for a specified value $\Psi o$.

Thus, a significant advantage of the present invention lies in the fact that it can implement trailing edge flaps of reduced dimensions together with low power. Specifically, the deflection of the flaps is modified only upon changes in the flight configuration. The feedback control of the flaps therefore gives rise to low-amplitude movements over relatively long times (typically several tenths of a second). This low power makes it possible to employ electric controls and articulations made of electrically deformable materials for the flaps. Finally, the flaps can be adjusted independently for each blade, therefore making it possible to circumvent any differences in their characteristics and their behavior.

BRIEF DESCRIPTION OF THE DRAWINGS

The figures of the appended drawing will elucidate the manner in which the invention may be embodied. In these figures, identical references denote similar elements.

DETAILED DESCRIPTION OF THE INVENTION

Figure 1:
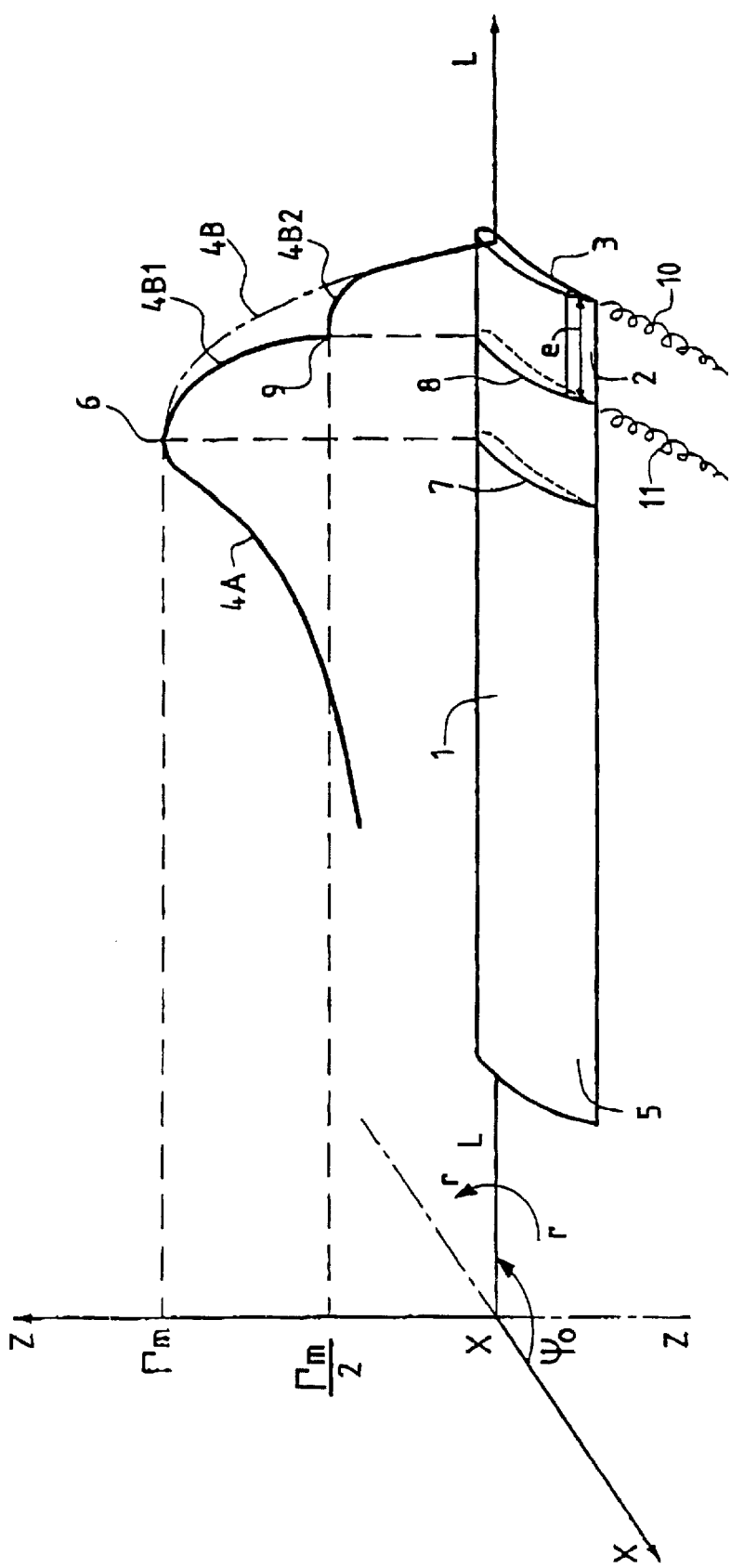
FIG. 1 diagrammatically illustrates the method of the present invention.

Represented in FIG. 1 is one of the blades 1 of a helicopter rotary wing of axis of rotation Z—Z, this rotary wing not being more fully represented.

The blade 1, of longitudinal axis L—L, revolves around said axis of rotation Z—Z of the rotary wing and, in the course of such a rotation, the azimuth T of the blade 1 is measured in the direction of rotation Z—Z starting from the rear part X—X of the longitudinal axis of the helicopter (not represented).

Figure 3:
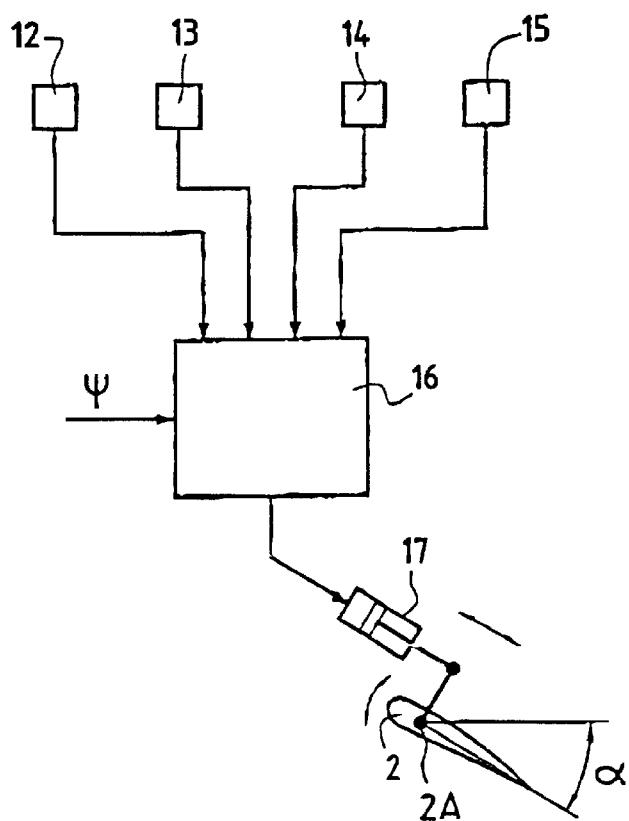
FIG. 3 is the schematic diagram of the control device of the flap shown in FIG. 2.

Moreover, the blade 1 comprises a trailing edge flap 2 extending as far as the outboard tip section 3 of the blade 1 and able to pivot about its axis 2A (see FIG. 3).

In a known manner, if the fluid edge flap 2 did not exist, the speed circulation around the blade 1 would exhibit along the span L—L of the latter, the profile of the curve 4A, 4B represented in the system of axes L—L, Z—Z. The curve 4A, 4B exhibits a part 4A increasing from the blade root 5 of said blade 1 toward the tip section 3 of the latter and passing through a maximum 6 and an arc-shaped part 4B, decreasing from said maximum 6 to a zero value at the blade tip section 3. Corresponding to the maximum 6 is the blade section 7 around which the speed circulation Γ takes the maximum value Γm. In a likewise known manner, it is this decreasing part 4B of the curve 4A, 4B which generates at the tip of the blade 1 a vortex producing BVI noise.

Also, according to the invention, at least one value Ψo of the azimuth Ψ at which the tip vortex is the cause of a peak intensity of the BVI noise, part 4B of the curve 4A, 4B is modified by means of the trailing edge flap 2. As a general rule, at least one value Ψo lies between 120° and 150° and, still more generally, this value Ψo is roughly 130°.

The span e of the flap 2 is chosen such that the latter extends approximately from the blade section 8 located approximately midway between the section of maximum speed circulation 7 and the tip section 3.

In this way, a deflection a can be applied to the trailing edge flap 2, the value of this deflection being constant in terms of azimuth Ψ, but which deflection, for the value Ψo, makes it possible to transform part 4B of said curve 4A, 4B, so as to give it the shape of the two decreasing consecutive arcs 4B1 and 4B2. The arc 4B1 decreases from the maximum 6, corresponding to the blade section 7 around which the speed circulation is a maximum and equal to Γm, to a point 9 corresponding to the blade section 8 around which the speed circulation is then at least approximately equal to ½×Γm. The arc 4B2 decreases, for its part, from said point 9 to the zero value at the tip section 3.

Consequently, by virtue of the action of the trailing edge flap 2, two similar vortices 10 and 11 respectively attached to the tip section 3 and to the section 8 occur, toward the blade tip 1, for the azimuth value Ψo and in the vicinity of this value, the speed circulation of said vortices being equal to ½×Γm. Consequently, a significant reduction (several decibels) in the BVI noise due to the vortices shed around the value Ψo of the azimuth is obtained.

As is known, the speed circulation around a blade section is proportional to the coefficient of lift of this section, which is itself a function of the pressure difference between the bottom surface and the top surface of said section.

Figure 2:
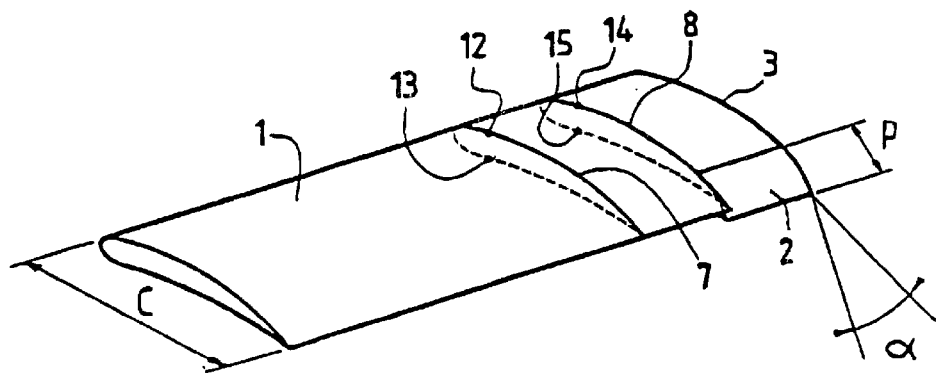
FIG. 2 shows the locations of pressure sensors on the blades of the rotary wing.

Also, as is represented diagrammatically by FIGS. 2 and 3, to implement the method it is possible to dispose:

in the blade section 7 or in the vicinity of the latter, at least one pressure sensor 12 on the top surface of the blade 1 and at least one pressure sensor 13 on the bottom surface of this blade;

in the blade section 8 or in the vicinity of the latter, at least one pressure sensor 14 on the top surface of said blade 1 and at least one pressure sensor 15 on the bottom surface of this blade.

A computer 16, receiving the signals shed by the sensors 12 to 15, and continuously knowing the azimuth Ψ of the blades 1, can therefore compute at the value Ψo of said azimuth and in the vicinity of this latter value, the respective coefficients of lift of the section 7 and of the section 8. With the aid of these lift coefficients, the computer 16 computes the speed circulation Γ7=Γm around the blade section 7 and the speed circulation Γ8 around the section of the blade 8 and it generates a deflection command which it addresses to an actuator 17, controlling the deflection of the flap 2. In the exemplary embodiment of FIG. 1, this deflection command is such that the speed circulation Γ8 is equal to half the speed circulation Γ7.

The deflection command could be a computed (by the computer 16) value of the angle of deflection α. This deflection command may also be the variation dα/dt of said angle of deflection with respect to the time t. Such a deflection command appropriate to the method of FIG. 1 can be of the form $$d\alpha/dt = K(\Gamma 7 - 2\Gamma 8)$$

in which expression K is a constant coefficient.

It will be observed that, when the rotary-wing aircraft comprises a flight computer, the latter is capable of computing, on the basis of the flight conditions (load, speed, rate of climb or of descent, etc.) and of the type of the blade 1, the spanwise distribution of the lifting forces and hence the speed circulation around the sections 7 and 8. In this case, the sensors 12 to 15 could be omitted, or else be used to corroborate the results of the computations by the flight computer.

It will be observed that the measurements or the computations of Γ7 and Γ8 are performed at each revolution of each blade so that the control of the trailing edge flaps 2 may be regarded as being a closed-loop feedback control.

It will moreover be noted that the speed circulation around the blade sections 7 and 8 can be determined indirectly by measurements of the local bending moment of the blade 1. Consequently, it is possible to replace the pressure sensors 12 to 15 with strain gauges or similar sensors capable of measuring local bending moments of this type.

From the foregoing, it can therefore be seen that the deflection of the flaps 2 can be feedback-controlled, through a relatively simple control 16, 17, in relation to local measurements and/or computations of pressure or of local strains, so as to maintain a balanced division of the blade tip vortex into two lesser vortices 10 and 11, regardless of the flight configuration and its fluctuations.

Figure 4:
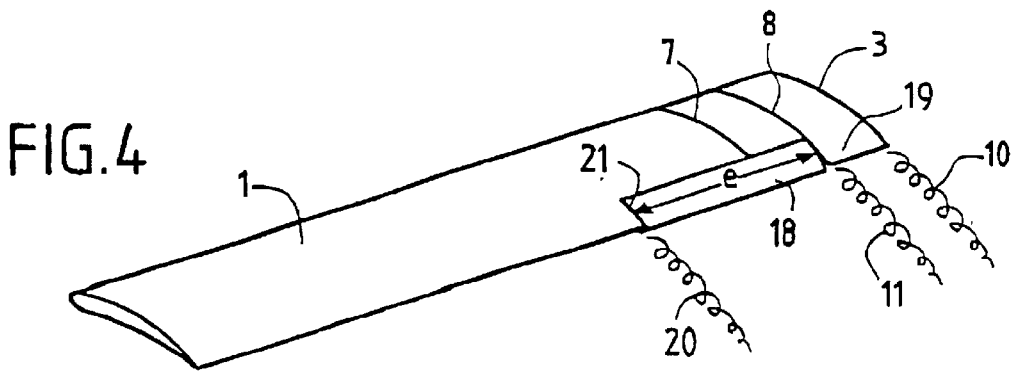
FIG. 4 diagrammatically illustrates a variant implementation of the method in accordance with the present invention.

In the variant implementation of the invention represented in FIG. 4, each blade 1 comprises, instead of the flap 2, a trailing edge flap 18 which is separated from the blade tip section 3 by a tip portion 19 of this blade 1. This blade tip portion 19 extends between said blade tip section 3 and the blade section 8 located at least approximately midway between the section 7 around which the speed circulation is a maximum and the blade tip section 3. In this case, a vortex 20, adhering to the inboard tip 21 of said flap 18, occurs in addition to the vortices 10 and 11 adhering to the blade sections 3 and 8. In order for this vortex 20 to have no noise-producing effect, it suffices for the span of the flap 18 to be sufficiently large for said vortex 20 to be spaced apart from the tip section 3, in the direction of the axis of rotation Z—Z.

Experience shows that such a condition is satisfied when the span e of the flap 18 is at least equal to 3 C, C being the chord of the airfoil of the blade 1.

Experience has shown that it is advantageous for the blade 1 to be equipped with just a single flap, of span lying between 0.4 C and 3 C, preferably of the order of 1.2 C.

Experience has also shown that it is advantageous for the depth p of the flaps 2 and 18 to lie between 0.1 C and 0.4 C, preferably of the order of 0.25 C.

What is claimed is:

1. A method for reducing noise generated by a rotary wing of an aircraft, said noise arising from, in the course of rotation of said rotary wing and of advancing of said aircraft, each one of said blade of said rotary wing encountering a tip vortex generated by a previous one of said blades, said method implementing at least one trailing edge flap disposed toward an outboard tip of each one of said blades, said method comprising the steps of:

determining at least one value Ψo of the azimuth of the blades, for which value Ψo said blades shed tip vortices responsible for a peak intensity of said noise;

determining a section of each one of the blades around which speed circulation is a maximum, said speed information being represented by lift information;

disposing said trailing edge flap on said each one of the blades such that the trailing edge flap generates at least one auxiliary vortex, parallel to said tip vortex and attached to a section of said each one of the blades lying between said section around which the speed circulation is a maximum and the tip section of said each one of the blades; and applying a deflection to said trailing edge flap, a value of said deflection being constant in azimuth, but such that, for said value Ψo of the azimuth, the speed circulation around said blade section to which said auxiliary vortex is attached is a specified fraction of said maximum speed circulation.

2. A method according to claim 1, wherein:

a single said trailing edge flap is employed for said each one of the blades;

said section to which said auxiliary vortex is attached is located at least approximately midway between said section around which the speed circulation is a maximum and said tip section of said each one of the blades; and the speed circulation around the blade section to which said auxiliary vortex is attached is at least approximately equal to half said maximum speed circulation.

3. A method according to claim 1, wherein said value Ψo of the azimuth of the blades lies between 120° and 150°, reckoned in the direction of rotation of the blades starting from the 0° azimuth which corresponds to the rear part of the longitudinal axis X—X of the aircraft.

4. A method according to claim 1, wherein said each one of the blades comprises a said trailing edge flap which extends as far as the blade tip section.

5. A method according to claim 1, wherein said each one of the blades comprises a said trailing edge flap which is separated from said blade tip section by a tip portion of said each one of the blades.

6. A method according to claim 1, wherein said lift information originates from pressure measurements performed on said blades and, for this purpose, pressure sensors are disposed, in said blades, in said section around which the speed circulation is a maximum, as well as in the blade section located approximately midway between said section around which the speed circulation is a maximum and the blade tip section.

7. A method according to claim 1, wherein the law of deflection of said trailing edge flap is of the type:

$$d\alpha/dt = K(\Gamma 7 - 2\Gamma 8)$$

in which expression:

dα/dt represents a temporal variation of an angle of deflection α of said trailing edge flap, Γ7 is a maximum value of the speed circulation around said blades, for the azimuth Ψo, Γ8 is a value of the speed circulation around the blade section to which said auxiliary vortex is attached for the azimuth Ψo, and K is a constant coefficient.

8. A method for reducing noise generated by a rotary wing of an aircraft, said noise arising from, in the course of rotation of said rotary wing and of advancing of said aircraft, each one of the blades of said rotary wing encounters the tip vortex generated by a previous one of said blades, said method implementing at least one trailing edge flap disposed toward the outboard tip of said each of said blades, said method comprising the steps of:

determining at least one value Ψo of the azimuth of the blades, for which value Ψo said blades shed tip vortices responsible for a peak intensity of said noise;

determining a section of each one of said blades around which the speed circulation is a maximum, said speed information being represented by strain information measured on said blades;

disposing said trailing edge flap on said each one of said blades such that the trailing edge flap generates at least one auxiliary vortex, parallel to said tip vortex and attached to a section of said each one of said blades lying between said section around which the speed circulation is a maximum and the tip section of said each one of said blades; and applying a deflection to said trailing edge flap, a value of said deflection being constant in azimuth, but such that, for said value Ψo of the azimuth, the speed circulation around said blade section to which said auxiliary vortex is attached is a specified fraction of said maximum speed circulation.

9. A method according to claim 8, wherein:

a single said trailing edge flap is employed for said each one of said blades;

said section to which said auxiliary vortex is attached is located at least approximately midway between said section around which the speed circulation is a maximum and said tip section of said each one of said blades; and the speed circulation around the blade section to which said auxiliary vortex is attached is at least approximately equal to half said maximum speed circulation.

10. A method according to claim 8, wherein said value Ψo of the azimuth of the blades lies between 120° and 150°, reckoned in the direction of rotation of the blades starting from the 0° azimuth which corresponds to a rear part of the longitudinal axis X—X of the aircraft.

11. A method according to claim 8, wherein said each one of said blades comprises a said trailing edge flap which extends as far as the blade tip section.

12. A method according to claim 8, wherein said each one of said blades comprises a said trailing edge flap which is separated from said blade tip section by a tip portion of said each one of the blades.

13. A method according to claim 8, wherein strain gauges are disposed, in said blades, in said section around which the speed circulation is a maximum, as well as in the blade section located approximately midway between said section around which the speed circulation is a maximum and the blade tip section.

14. A method according to claim 8, wherein the law of the deflection of said trailing edge flap is of the type:

$$d\alpha/dt = K(\Gamma 7 - 2\Gamma 8)$$

in which expression:

dα/dt represents a temporal variation of an angle of deflection a of said flaps, Γ7 is a maximum value of the speed circulation around said blades, for the azimuth Ψo, Γ8 is a value of the speed circulation around the blade section to which said auxiliary vortex is attached for the azimuth Ψo, and K is a constant coefficient.

15. A method for reducing noise generated by a rotary wing of an aircraft, said noise arising from, in the course of rotation of said rotary wing and of advancing of said aircraft, each one of said blade of said rotary wing encountering a tip vortex generated by a previous one of said blades, said method implementing at least one trailing edge flap disposed toward an outboard tip of each one of said blades, said method comprising the steps of:

determining at least one value $\Psi o$ of the azimuth of the blades, for which value $\Psi o$ said blades shed tip vortices responsible for a peak intensity of said noise;

determining a section of each one of the blades around which speed circulation is a maximum disposing said trailing edge flap on said each one of the blades such that the trailing edge flap generates at least one auxiliary vortex, parallel to said tip vortex and attached to a section of said each one of the blades lying between said section around which the speed circulation is a maximum and the tip section of said each one of the blades; and applying a deflection to said trailing edge flap, a value of said deflection being constant in azimuth, but such that, for said value $\Psi o$ of the azimuth, the speed circulation around said blade section to which said auxiliary vortex is attached is a specified fraction of said maximum speed circulation, wherein:
  a single said trailing edge flap is employed for said each one of the blades;
  said section to which said auxiliary vortex is attached is located at least approximately midway between said section around which the speed circulation is a maximum and said tip section of said each one of the blades;
  the speed circulation around the blade section to which said auxiliary vortex is attached is at least approximately equal to half said maximum speed circulation; and
  said lift information originates from pressure measurements performed on said blades and, for this purpose, pressure sensors are disposed, in said blades, in said section around which the speed circulation is a maximum, as well as in the blade section located approximately midway between said section around which the speed circulation is a maximum and the blade tip section.

16. A method for reducing noise generated by a rotary wing of an aircraft, said noise arising from, in the course of rotation of said rotary wing and of advancing of said aircraft, each one of said blade of said rotary wing encountering a tip vortex generated by a previous one of said blades, said method implementing at least one trailing edge flap disposed toward an outboard tip of each one of said blades, said method comprising the steps of:

determining at least one value $\Psi o$ of the azimuth of the blades, for which value $\Psi o$ said blades shed tip vortices responsible for a peak intensity of said noise;

determining a section of each one of the blades around which speed circulation is a maximum;

disposing said trailing edge flap on said each one of the blades such that the trailing edge flap generates at least one auxiliary vortex, parallel to said tip vortex and attached to a section of said each one of the blades lying between said section around which the speed circulation is a maximum and the tip section of said each one of the blades; and applying a deflection to said trailing edge flap, a value of said deflection being constant in azimuth, but such that, for said value $\Psi o$ of the azimuth, the speed circulation around said blade section to which said auxiliary vortex is attached is a specified fraction of said maximum speed circulation, wherein:
  a single said trailing edge flap is employed for said each one of the blades;
  said section to which said auxiliary vortex is attached is located at least approximately midway between said section around which the speed circulation is a maximum and said tip section of said each one of the blades;
  the speed circulation around the blade section to which said auxiliary vortex is attached is at least approximately equal to half said maximum speed circulation; and
  strain gauges are disposed, in said blades, in said section around which the speed circulation is a maximum, as well as in the blade section located approximately midway between said section around which the speed circulation is a maximum and the blade tip section.

17. A method for reducing noise generated by a rotary wing of an aircraft, said noise arising from, in the course of rotation of said rotary wing and of advancing of said aircraft, each one of said blade of said rotary wing encountering a tip vortex generated by a previous one of said blades, said method implementing at least one trailing edge flap disposed toward an outboard tip of each one of said blades, said method comprising the steps of:

determining at least one value $\Psi o$ of the azimuth of the blades, for which value $\Psi o$ said blades shed tip vortices responsible for a peak intensity of said noise;

determining a section of each one of the blades around which speed circulation is a maximum;

disposing said trailing edge flap on said each one of the blades such that the trailing edge flap generates at least one auxiliary vortex, parallel to said tip vortex and attached to a section of said each one of the blades lying between said section around which the speed circulation is a maximum and the tip section of said each one of the blades; and applying a deflection to said trailing edge flap, a value of said deflection being constant in azimuth, but such that, for said value $\Psi o$ of the azimuth, the speed circulation around said blade section to which said auxiliary vortex is attached is a specified fraction of said maximum speed circulation, wherein:
  a single said trailing edge flap is employed for said each one of the blades;
  said section to which said auxiliary vortex is attached is located at least approximately midway between said section around which the speed circulation is a maximum and said tip section of said each one of the blades;
  the speed circulation around the blade section to which said auxiliary vortex is attached is at least approximately equal to half said maximum speed circulations; and
  the law of deflection of said trailing edge flap is of the type:

$$d\alpha/dt = K(\Gamma 7 - 2\Gamma 8)$$

in which expression:
  $d\alpha/dt$ represents a temporal variation of an angle of deflection $\alpha$ of said trailing edge flap,
  $\theta 7$ is a maximum value of the speed circulation around said for the azimuth $\Psi o$,
  $\Gamma 8$ is a value of the speed circulation around the blade to which said auxiliary vortex is attached for the azimuth $\Psi o$, and
  $K$ is a constant coefficient.

\* \* \* \* \*